Aug. 23, 1927.

C. T. HIBBARD 1,640,323

STARTING SYSTEM FOR SYNCHRONOUS MOTORS

Filed May 15, 1923

TO UNLOADING
DEVICE

INVENTOR
Charles Truman Hibbard
BY
Pennie Davis Marvin & Edmonds
ATTORNEY

Patented Aug. 23, 1927.

1,640,323

UNITED STATES PATENT OFFICE.

CHARLES TRUMAN HIBBARD, OF MINNEAPOLIS, MINNESOTA, ASSIGNOR TO ELECTRIC MACHINERY MANUFACTURING COMPANY, OF MINNEAPOLIS, MINNESOTA, A CORPORATION OF MINNESOTA.

STARTING SYSTEM FOR SYNCHRONOUS MOTORS.

Application filed May 15, 1923. Serial No. 639,036.

This invention relates to starting systems for synchronous motors, this application being a continuation in part of my application Ser. No. 352,159, filed January 17, 1920. The present invention comprises a starting system of such a character that the synchronous motor, with which it may be used, may be started with a minimum of labor, and the motor is fully protected under all conditions of operation.

A polyphase synchronous motor may be started as an induction motor by making use of its damper winding, the starting torque being produced by the induced current in the damper winding and by the eddy-current and hysteresis loses in the pole faces. A synchronous motor can never reach synchronous speed under the action of the currents induced in the damper winding alone; however, if the damper winding is properly designed, the motor may reach a speed which is near enough to the synchronous speed to permit the motor to fall into step before the field is excited. The lagging component of the starting current will usually produce sufficient field excitation to cause the motor to pull into step.

When the motor has reached synchronous speed, the excitation is due entirely to the armature reaction. If the field is then closed at an instant when the magnetism produced by the field current opposes that produced by the armature reaction, the motor will slip 180 deg. and will only be pulled into step at the expense of a large rush of current. It is therefore desirable to provide some means whereby the field circuit will be closed at such a time that the field current will not oppose the polarity produced by the armature reaction.

A synchronous motor, starting as an induction motor, should have a low resistance damper winding if the motor is to pull into step easily. For the motor to start readily, especially under load, the resistance of the damper winding should be high. As a result of these conflicting requirements, a compromise is usually effected.

One object of this invention is to provide a starting system especially adapted to be used with synchronous motors, the system being such that it is merely necessary to close a single contact in a control circuit, to have the system operate to bring the motor up to speed and close the field circuit at the proper instant. This invention also provides means whereby the motor load may be applied to the motor only after the motor has been brought up to speed and the field circuit closed. It is therefore possible to design the motor so that the resistance of the damper winding will be such that the motor will pull into step readily. It is not necessary to have a high resistance damper winding, for the motor need not be started under load.

This invention includes a field switch and a frequency relay responsive to the induced current in the field winding, the frequency relay being of such a character that it operates to close the field switch at the proper instant to apply the field current to the field winding when the polarity produced by the armature action is such that it is not opposed by the field current. I prefer to provide a control circuit for applying line voltage to the motor armature. This control circuit may be actuated by closing a single contact, such as a push button contact, and the control mechanism then operates to close the line switch and apply full voltage to the motor armature. If it is so desired, however, an ordinary starting compensator may be employed for the purpose of applying reduced voltage to the motor armature until the motor has attained a predetermined speed, and then applying a full voltage to the armature. This invention includes a number of other devices which fully protect the motor under all conditions of operation, and permit the motor to be brought up to speed in the most efficient manner.

This invention may be better understood by considering the following detailed description which is to be taken in conjunction with the accompanying drawings, in which.

Figure 1:
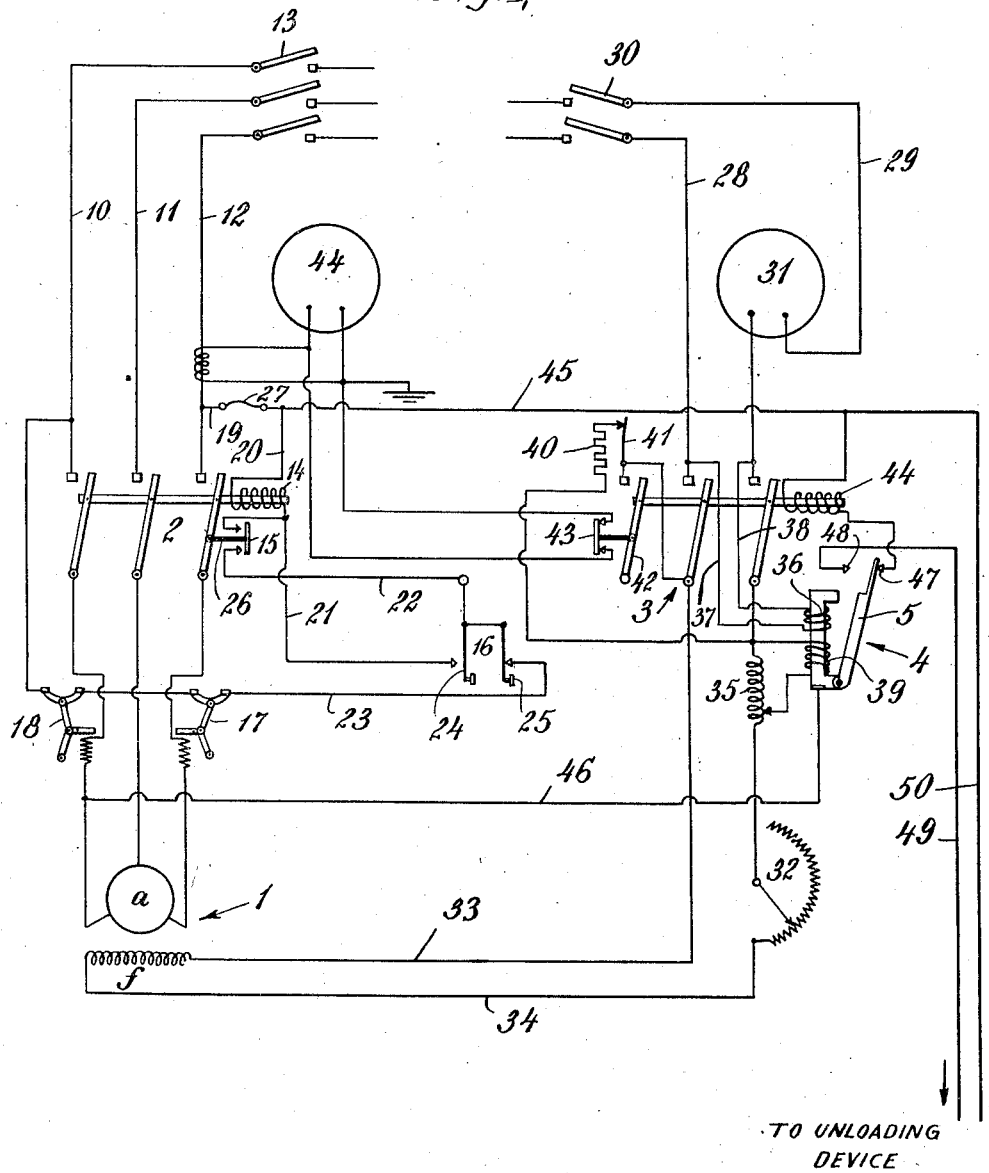
Fig. 1 is a circuit diagram of my improved starting system, including an improved starting control circuit.

In the embodiment of the invention illustrated in the drawings, the armature $a$ of the motor 1 is supplied with polyphase alternating current through the supply lines 10, 11 and 12, a cut-out switch 13 being provided in the supply circuit for the purpose of disconnecting the motor and starting system from the line. In the embodiment illustrated in Fig. 1, a line switch 2 is provided in the alternating current supply circuit, this line switch being operated by electromagnetic means actuated by a control circuit, which is shown connected across the lines 10 and 12. This control circuit includes the coil 14 of the electromagnetic switch 2, a seal 15 and a double push button switch 16. The control circuit is completed by the conductors 19, 20, 21 or 22 and 23. Push button 24 of switch 16 may be actuated to close the control circuit to start the motor, and push button 25 may be actuated to open this control circuit when the motor is to be stopped.

The operation of the control circuit may be described as follows: When the push button 24 is actuated, the control circuit is completed through conductors 19, 20, coil 14, conductor 21, switch 16 and conductor 23. The current flowing in this control circuit causes the line switch 2 to close. When this switch closes, an arm 26, carried thereby, closes the seal 15 and completes the control circuit through conductors 19, 20, coil 14, seal 15, conductor 22, switch 16 and conductor 23. The circuit therefore remains closed after the push button 24 is released. Overload relays 17 and 18 are provided, the contacts of these relays forming a part of the control circuit, so that when these relays operate, the control circuit is opened and the switch 2 opens because it is no longer held closed by the coil 14. A fuse 27 is preferably inserted in conductor 19 for the purpose of protecting the control circuit in case of any short circuit in this part of the system. Since the switch 2 is held closed by virtue of the current flowing in the control circuit, it is evident that if the line voltage fails, the switch 2 opens and the motor will not start again until the push button 24 is actuated. When the switch 2 opens, the seal 15 is also opened.

The motor field $f$ is supplied with direct current through the lines 28 and 29, which may be connected to a source of direct current by means of the cut-out switch 30. An electromagnetic field switch 3 is provided in the field circuit, this switch being actuated by a frequency relay which is preferably a polarized relay. An ammeter 31 and rheostat 32 are connected in the field circuit in the usual manner. As illustrated in the drawing, one terminal of the field winding $f$ is connected by lead 33, directly to one terminal of the switch 3; and the other terminal of the field winding is connected by means of a lead 34 to another terminal of the switch 3 through the rheostat 32 and a reactance 35 which is therefore connected in series with the field winding. The relay 4 is provided with a direct current coil 36 connected by leads 37 and 38 to the direct current supply leads 28 and 29. The alternating current coil 39 of the relay 4 is connected across the reactance 35. The armature 5 of the relay 4 is arranged so that it remains in its open position unless alternating or pulsating current is flowing in the coil 39. A resistance 40 is arranged in parallel with the reactance 35 and the motor field winding $f$. As illustrated in the drawing, this resistance 40 is connected across the field leads 33 and 34, a switch 41 being arranged in series with the resistance. An arm 42 of the switch 3 is adapted to operate a seal 43, and to operate the switch 41 in series with the resistance 40. The seal 43 is in effect a shunt across the terminals of an ammeter 44 which measures the line current supplied to the motor armature $a$. When the switch 3 is open the seal 43 is closed, thus short circuiting the ammeter, and when the switch is closed the seal 43 is open. When the switch 3 closes, the switch 41 is opened, thus disconnecting the resistance 40 from the field circuit.

The coil 44 of the field switch 3 is supplied with alternating current, by the lead 45 which is connected to one line of the alternating current supply circuit. In the drawing, the lead 45 is shown connected to line 12 of the supply circuit through conductor 19. The circuit including the coil 44 is completed through the armature 5 of the frequency relay 4 and a lead 46 which is connected to one of the alternating current supply lines between the line switch 2 and the motor 1. Unless an alternating or pulsating current is flowing in the coil 39, the armature 5 closes the circuit including coil 44, through the contact 47.

The frequency relay 4 is adapted to operate an unloading device which relieves the motor from its load during the starting period. A circuit is provided for the purpose of operating the unloading device which may be an air valve in case the motor is driving a compressor, a magnetic clutch, or any other suitable device which may be conveniently operated or controlled by an electric circuit. Such a device is illustrated in my co-pending application Serial No. 699,171, filed March 14, 1924. The relay 4 is provided with a contact 48 and a lead 49 which extends to the unloading device. A second lead 50 extends from the unloading device to one of the alternating current supply lines. In the embodiment shown in Fig. 1, this lead 50 is connected to supply line 12 through leads 45 and 19. When the armature 5 is in its closed position the circuit of the unloading device is completed through lead 46, armature 5, contact 48, leads 49, 50, 45 and 19. When the armature 5 moves to its open position, the circuit of the unloading device is opened and this device then operates to apply the load to the motor.

When the motor is not running, the line switch 2 and the field switch 3 are open. The seal 15 and the armature 5 are also in open position, and the seal 43 is closed thus short circuiting the ammeter 44. The resistance 40 is connected in parallel wtih the field winding f and the reactance 35, for the switch 41 is closed when the field switch 3 is open. The cut-out switches 13 and 30 are normally closed at all times.

To start the motor 1, it is merely necessary to actuate the push button 24 which completes the control circuit and causes the line switch 2 and the seal 15 to close and remain closed. The switch 2 remains closed as long as current flows in the control circuit including the coil 14 of the switch; and, therefore, until this circuit is opened by pressing push button 25, by the operation of the overload relays 17 and 18, or by failure of the line voltage.

When voltage has been applied to the motor armature, a high frequency alternating current is induced in the field winding. As long as the frequency of this current remains high, considerable current flows through the coil 39 of the frequency relay 4, due to the fact that the impedance of the reactance 35 is much greater at high frequency than at low frequency. Therefore, as soon as voltage is supplied to the armature a, the armature 5 of the frequency relay 4 is immediately closed, thus completing the circuit of the unloading device and breaking the circuit which includes the coil 44 of the field switch before this switch has had time to close. As the motor speed increases, the frequency of the induced field current decreases proportionately. When the motor has nearly reached synchronous speed, the current flowing thru coil 39 is so low that it no longer holds the armature 5 closed. The armature 5 which may have a spring adjustment is released at an instant when the magnetism produced by the coil 36 opposes that produced by coil 39. The circuit including coil 44 of the field switch is therefore closed at the proper instant to insure that the field switch will be closed when the field current does not oppose the polarity produced by the armature reaction of the motor. When the relay 4 operates to close the switch 3, the circuit of the unloading device is opened, thus permitting the load to be applied to the motor. The seal 43 and switch 41 are open so that the ammeter 42 indicates the line current, and the resistance 40 is no longer included in the field circuit.

To stop the motor, it is merely necessary to press the push button 25. This breaks the control circuit and opens the line switch 2 which in turn opens the circuit including coil 44 of the field switch. Thus by merely pressing the push button 25, the line switch 2 and the field switch 3 are opened and the motor is in condition to be started again by pressing push button 24.

Figure 2:
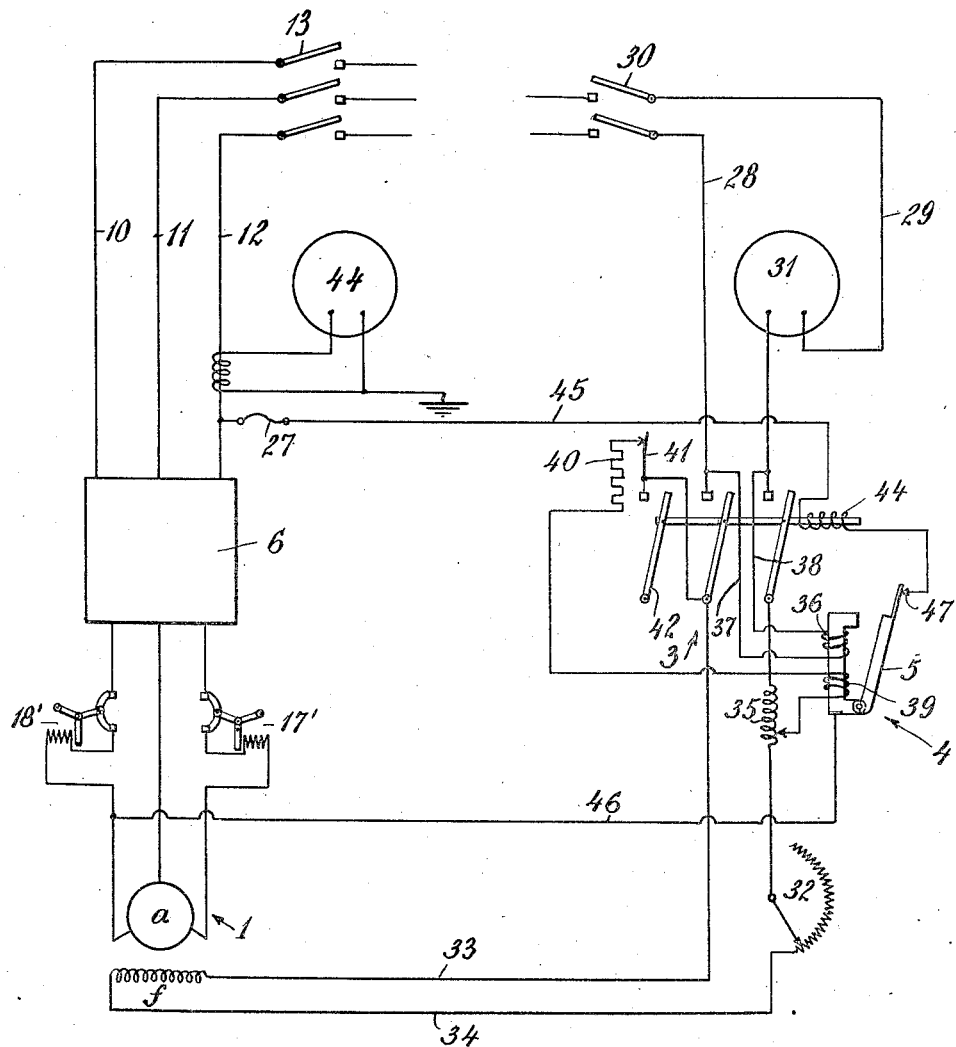
Fig. 2 is a circuit diagram of my invention as applied to a motor which is provided with an ordinary starting compensator.

The embodiment of the invention illustrated in Fig. 2 of the drawing is substantially the same as that shown in Fig. 1, with the exception of the line switch. Like parts in the two figures bear the same reference characters. In Fig. 2 a starting compensator or other suitable switching device 6 is employed for the purpose of applying reduced voltage to the motor armature during the early part of the starting period. The starting device 6 may be of any common type and may be operated in the ordinary manner. The overload relays 17' and 18' are connected in the line between the compensator and the motor, instead of in the control circuit as shown in Fig. 1. The field switch mechanism is the same as that shown in Fig. 1, except that the seal 43 and the circuit of the unloading device are omitted.

To start the motor illustrated in Fig. 2, it is merely necessary to operate the starting compensator 6 in the usual manner. When the motor has nearly reached synchronous speed, the field switch mechanism operates automatically to close the field circuit at an instant when the field current does not oppose the polarity produced by the armature action, the operation of the field switch mechanism being exactly the same as that of the corresponding mechanism shown in Fig. 1.

Regardless of the type of starting switch employed, I prefer to arrange the field switch and the frequency relay, which operates this switch, near the motor. These parts may conveniently be assembled to form a compact unit which may be mounted on or near the motor frame. This unit may include the field switch 3, the resistance 40, seal 43, reactance 35 and the polarized frequency relay 4. The line switch 2 and the starting control mechanism, including the seal 15 and double push button switch 16, may be mounted on a switchboard or panel. The overload relays, the ammeters 44 and 31, and the field rheostat 32 may also be mounted on the switchboard.

The protection afforded to the motor windings by this invention is very great in comparison to the protection afforded by starting systems now in common use. The frequency relay 4 serves as a kick-off relay for opening the field circuit whenever the motor is desynchronized. If the motor falls out of step due to low voltage on the power lines, overload on the motor, or any other disturbance, a pulsating current will be produced in the field circuit and this current, flowing through the coil 39 of the relay 4, will cause the relay to open the field switch by breaking the circuit including the coil 44. If the line voltage fails for a considerable time, the motor will come to rest and the switch 2 will open automatically, so that when the line voltage is restored the motor will not start until the push button 24 is actuated. If the voltage fails momentarily, and the voltage is restored in a few seconds, the motor will slow down, but may not have time to come to rest before the voltage comes on the line again. During the period of slowing down, the motor will be acting as a generator supplying current to the coil 14 at a decreasing voltage and decreasing frequency. This will hold the line switch 2 closed for a time, depending upon the adjustment of this switch, and, under average conditions, until the motor speed has decreased to approximately one-half synchronous speed. The instant that the voltage returns to the line, a pulsating current will be induced in the field winding; even though it is carrying direct current excitation. This pulsating current will actuate the relay 4, instantly opening the switch 3, unloading the motor, and leaving the motor in normal condition to come back to synchronism as an induction motor. When synchronism is reached, the field switch will again be closed and the load applied, thus putting the motor back into normal operation.

If the excitation fails entirely, the motor operates for a short time as an induction motor, drawing current from the line in excess of its rated capacity. Within the time limit for which the overload relays are adjusted, the overload relays will trip the line switch 2 and stop the motor, thus disconnecting the motor from the line. If the excitation voltage falls below normal, so that the field current is not sufficient to hold the motor in step, the field switch will be opened by the relay 4 and the motor will operate as an induction motor. The unloading device permits the motor to pull into step several times until ultimately the overload relays open the main line switch.

If the motor becomes overloaded through improper adjustment of the driven apparatus, the overload relays will open the line switch 2 which in turn opens the field switch 3 and the motor will come to rest.

It is to be understood that the arrangement of the various parts of my improved starting system may be varied without departing from the scope of the invention, which is not limited to the particular embodiments shown and described, but is intended to include such modifications thereof as fall within the scope of the appended claims.

Furthermore, it will be understood that this invention is applicable to various kinds of electrical machines and accordingly it is in no way limited to its use in conjunction with synchronous motors. It may be used to advantage with rotary converters, alternators and other machines having starting characteristics similar to those of synchronous motors.

I claim:

1. In a system of the type described, the combination with a motor having a field winding, of a source of excitation for the field winding, a switch for supplying excitation current to the field winding of the motor, a polarized frequency relay for operating said switch, an ammeter for measuring the current supplied to the motor armature, and a resistance connected into the field circuit of the motor, said switch having an arm arranged to short circuit said ammeter when said switch is open and to open the circuit of the resistance in the field circuit when said switch is closed.

2. In a system of the type described, the combination with a motor having an armature and a field winding, of a source of excitation for the field winding, a line switch for the motor armature, an electromagnetic switch for supplying excitation current to the field winding of the motor, and a polarized frequency relay responsive to the induced current in the field winding for operating said electromagnetic switch, said electromagnetic switch having a coil one terminal of which is connected to a terminal of the supply line for the motor and the other terminal of which is connected through the frequency relay to a line terminal between the line switch and the motor.

3. In a system of the type described, the combination with a motor having an armature and a field winding, of a source of excitation for the field winding, means for applying voltage to the armature of the motor, automatic means for supplying excitation current to the field winding of the motor when it has reached a predetermined speed, and means for applying the motor load to the motor, the said automatic means being arranged to actuate the said means for applying the motor load to the motor when said automatic means operates to supply the excitation current to the field winding.

In testimony whereof I affix my signature.

CHARLES TRUMAN HIBBARD.